C. W. Isbell.
Pipe Coupling.
Nº 29,281.  Patented Jul. 24, 1860.

Witnesses
Geo. W. Bigelow
Alonzo S. King

Inventor
Charles. W. Isbell

UNITED STATES PATENT OFFICE.

CHARLES W. ISBELL, OF NEW HAVEN, CONNECTICUT.

GAS AND WATER PIPE JOINT.

Specification forming part of Letters Patent No. 29,281, dated July 24, 1860; Reissued May 25, 1869, No. 3,459.

*To all whom it may concern:*

Be it known that I, CHAS. W. ISBELL, of the city and county of New Haven, in the State of Connecticut, have invented a new and Improved Method of Constructing the Joints of Gas and Water Pipes; and I do hereby declare that the following is a full, clear, and exact description of the construction and operation of the same, reference being had to the accompanying drawings, making part of this specification, in which—

Figure 1:
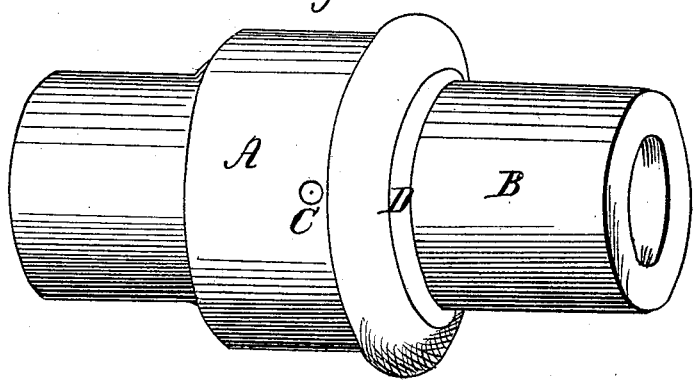
Figure 2:
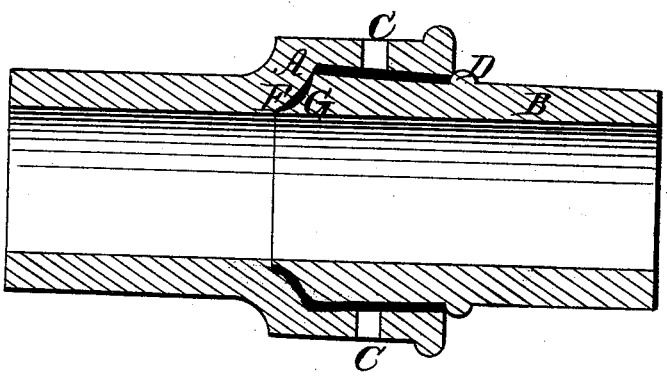

Figure 1 is a perspective view. Fig. 2 is a vertical, central, longitudinal section of the same.

In Fig. 1 A represents a socket formed upon a section of pipe to receive the end of the pipe B.

C represents an upper opening through the socket; D, a semicircular or other projection cast upon the periphery of the pipe B.

In Fig. 2, A B C D refer to corresponding parts.

F is the shoulder at the bottom of the cavity of the socket A; G, shows the outline of the end of the pipe B.

The socket A is constructed with two openings an upper and lower, for the purpose hereafter mentioned, and having the diameter of the mouth of the socket of sufficient size to receive the end of the pipe B. This diameter gradually increases to the bottom of the cavity, thus making the same conical or wedge shaped—smallest at the outside and ending in the shoulder F, whose outline is the arc of a circle. The end of the pipe B is also the arc of a circle but of different radius from that of the shoulder F, thus forming a recess (between the shoulder and the end of the pipe B when the same are in contact) to be filled with clay or other plastic substance. At the point where the outer extremities of the arcs F and G meet, the diameter of the pipe B corresponds with the mouth of the cavity in the socket, and then gradually decreases for a distance equal to the depth of the cavity until it is the same as the main sections of the pipe, thus making it also wedge formed, or dove tailing, and leaving a space between the socket and pipe, into which is poured the fusible packing. The semicircular or other projection D is made larger than the space to be filled, and in such position upon the periphery of the pipe B as to close tightly the mouth of the socket, when the end of the pipe B is made to bear against the shoulder F. By this method of construction, viz., a wedge shaped cavity in the socket with an outward curved shoulder, and the pipe B also wedge formed with the curved tapering end, the sections of pipe are made absolutely self centering, and unyielding, under all circumstances.

In order to make the joint ready for service, a ring of clay, or other suitable plastic substance, is laid upon the curve G of the pipe B, to prevent the flow of the fusible packing into the inside. The pipe is then pushed into the socket until the end bears against the shoulder F, and the semicircular, or other projection, closes the mouth of the cavity. The lower opening is then closed, and any fusible packing which expands in cooling from a melting heat, (I use a composition of sulfur and red lead) is poured into the upper opening until the space is filled: thus insuring a tight joint, which owing to the wedge shaped cavity and pipe cannot be drawn asunder until the packing has again been melted and drawn off at the lower opening: which must be done when taking up the pipe becomes necessary.

The nature of my invention is to provide a perfect safeguard against the escape of water and gas from the joints of pipes, by making it impossible for them to draw apart, to strengthen them by the increased thickness of metal at the ends, and the absence of any groove or chamber cutting into the substance of the pipe, to make them self centering, and so as to be easily taken up without injury, and finally to make a cheaper joint in the matters of time, labor, and material, all which advantages have long been needed, and are herein supplied.

I do not claim making a space for packing between the socket, and pipe, as this has long been used, neither do I claim any arrangement of rings upon the pipe or any device whatsoever to form a groove or cement chamber.

What I do claim is—

1. My improved method of constructing the joint in the manner and for the purpose specified.

2. The combination of the wedge shaped cavity, the shoulder F, and the upper and lower openings of the socket A: with the wedge formed portion of the pipe B, the semi-circular, or other projection, D, the recess formed between the end of the pipe B, and the shoulder F, the whole arranged substantially as specified for the purpose herein set forth.

CHARLES W. ISBELL.

Witnesses:
 GEO. W. BIGELOW,
 ALONZO S. KING.